United States Patent [19]
Sudbury

[11] Patent Number: 6,004,069
[45] Date of Patent: Dec. 21, 1999

[54] METHOD FOR CAPPING MINE WASTE AND TAILING DEPOSITS

[75] Inventor: Michael P. Sudbury, Oakville, Canada

[73] Assignee: Falconbridge Limited, Toronto, Canada

[21] Appl. No.: 08/865,158

[22] Filed: May 29, 1997

[51] Int. Cl.⁶ ..................................................... B09B 1/00
[52] U.S. Cl. ........................ 405/129; 210/901; 588/249
[58] Field of Search .................... 405/128, 129, 405/263; 588/249, 250, 259, 261; 210/901

[56] References Cited

U.S. PATENT DOCUMENTS

| | | | |
|---|---|---|---|
| 3,586,624 | 6/1971 | Larson | 405/129 X |
| 4,778,628 | 10/1988 | Saha et al. | 405/129 X |
| 5,090,843 | 2/1992 | Grigsby | 405/129 |
| 5,118,219 | 6/1992 | Walker, Jr. | 405/128 |
| 5,141,362 | 8/1992 | Kugler | 405/128 |
| 5,374,139 | 12/1994 | Kugler | 405/129 |
| 5,413,433 | 5/1995 | Davies | 405/129 |
| 5,463,172 | 10/1995 | Marvy | 588/252 |
| 5,466,407 | 11/1995 | Downs et al. | 405/129 X |
| 5,550,315 | 8/1996 | Stormont | 588/259 |
| 5,593,248 | 1/1997 | Kansa | 405/128 |
| 5,690,448 | 11/1997 | Fasullo et al. | 405/129 |
| 5,846,179 | 12/1998 | Price | 588/261 |

FOREIGN PATENT DOCUMENTS

| | | |
|---|---|---|
| 2038377 | 9/1990 | Canada . |
| 2090141 | 8/1993 | Canada . |
| 1327027 | 2/1994 | Canada . |
| PCT/WO94/29233 | 12/1994 | WIPO . |

OTHER PUBLICATIONS

"Current Status of the Sloped Thickened Tailing Disposal System" by E.I. Robinsky, Proc. Int. Conf. (1987) Bauxite Tailings, Kingston, Jamica, 1986.

*Primary Examiner*—George Suchfield
*Attorney, Agent, or Firm*—Bereskin & Parr

[57] ABSTRACT

A method for providing a composite capping cover for maintaining the surface of a sulphide bearing tailing and mine waste containing deposit moist thereby substantially eliminating oxidation of the sulphidic particulate in the deposit and the formation of heavy metal salts. The moisture is provided by atmospheric precipitation. The composite capping cover comprises a fine particulate layer, a fine-granular particulate layer and a coarse-granular particulate layer, the particle sizes of the particles making up the individual the layers having been selected such that the hydraulic conductivity of the layers increases with successive layers while the matric suction value within the layers decreases.

21 Claims, 4 Drawing Sheets

CUMULATIVE PERCENT PASSING vs PARTICLE SIZE

METHOD FOR CAPPING MINE WASTE AND TAILING DEPOSITS

FIELD OF THE INVENTION

This invention relates to the treatment of waste products of mining and mineral processing of ores and industrial minerals for rendering such environmentally acceptable.

BACKGROUND OF THE INVENTION

The mining industry is engaged in mining and recovering ores of metals and minerals from the ground, subsequently processing the ores and minerals to provide raw materials which are then further processed to obtain products of commercial use and value. The mined ores and minerals often contain the value metal compound or the commercially usable mineral in amounts less than 15 wt %, and therefore the ore or the mineral, needs to be subjected to various mineral separation and concentration processes. The mineral separation process usually comprises several process steps, eventually yielding a concentrate of the desired metal compound or mineral, and waste rock and tailings. The tailings may still contain low levels of the mineral or the value metal compound, however, the bulk of the tailings consists of gangue minerals, silicates, waste rock and other substances accompanying the ore or mineral in the ground. It is noted that when the value metal is in a form of a sulphidic compound, the tailings usually contain substantial amounts of iron sulphide which is often the host mineral of the value metal compound in the ground.

The tailings produced in the mineral separation process steps are often in a form of an aqueous slurry, such as for example, tailings resulting in flotation separation process steps, but they may also be dry. The particle size of tailings range from very fine to granular or sandy, often referred to as slimes and tailing sands, respectively. The tailings together with waste rock are usually regarded as waste products of mining processes. Tailings and similar mine waste products have often been deposited and left at the side of mining operations as tailing piles or dumps, or deposited in ponds or placed into cavities in the ground, such as mine shafts which may be subsequently flooded. Such remains of mining operations were often an eyesore, but most detrimentally, the oxidation products could lead to contamination of the regional surface and ground waters. Environmental regulations now require that a mining company takes responsibility for the visual appearance of the surroundings of the mine, and takes appropriate steps to ensure that the tailings and similar waste rock produced, and the effluent generated, do not contaminate the regional waters nor the environment. Furthermore, regulations also require that when a mine is decommissioned the mining area is left in such state that unpleasant, unsightly and harmful consequences of the mining operation, be that actual or potential, are controlled or eliminated. One of the most significant harmful effects of improper tailing management, is the possible chemical contamination of the regional waters. The regional waters may become contaminated as a result of escaped water soluble mining process reagents or oxidation products of substances in the mine waste products, such as remains of flotation separation and similar reagents in the tailings, but more particularly, as a result of atmospheric oxidation of the sulphides contained in the tailings, which can lead to acid generation and to the formation of sulphates and other heavy metal compounds which are subsequently solubilized and mobilized by rain. The water soluble compounds may interact with the surroundings of the tailing deposit in a manner that can cause contamination, unless properly intercepted and treated.

The subject of tailing management is discussed in several publications, and has become an important part of the initial mine design and mine operation, and the required closure planning conducted by responsible mining companies. A procedure sometimes practiced in handling tailings, is to feed a thickened slurry of the tailings at a point above the pile, allowing the tailings slurry to run down the sides of the pile. The tailing sands usually settle above the fines and the run-off water collects at the bottom. The run-off water may be treated subsequently to remove or neutralize harmful components. A method of treatment of mineral tailings is described in published Canadian patent application 2,090, 141, which was filed by Peter Davies on Feb. 23, 1993. The treatment includes separating the tailings by physical separation process steps into a slime or fine fraction and a coarse fraction, then depositing alternating layers of these in the tailing deposit pile, thus allowing the effluent to run away more readily while the layers get compacted by their own weight. It is noted, however, that such tailing treatment methods are usually not recommended for sulphidic tailings and/or sulphide containing waste rock, which may yield undesirable oxidation products when exposed to atmospheric oxidation.

Another object of tailing management is to improve the appearance of tailing piles, by providing new growth surfaces for vegetation. Successful revegetation, however, is usually costly and the soil deposited on top of the tailings needs to be deep enough to isolate the roots of the plants from the underlying tailings, especially if the oxidation products generated in the tailings are detrimental to plant growth. The soil layer has to be able to sustain growth of the plants, however, a thick soil layer on top of a sulphide bearing tailing deposit may have little or no effect on the continued oxidation, nor on the solubilization of heavy metal salts and acid formation already present therein.

As discussed above, acid drainage caused by oxidation of sulphides in tailings and similar waste rock is considered a serious threat to the environment. Sulphidic minerals within an ore body will not oxidize as long as the ore body is not exposed to atmospheric oxygen in the presence of moisture. However, once the excavated sulphide bearing rocks and minerals are brought above ground and subjected to mineral separation processes, the sulphide in the tailing pile, waste rock and similar waste and by-products of mining processes, will be subject to oxidation, yielding sulphate and ferric ions which react with more pyrite in the tailings, thus promoting further in-situ oxidation and producing sulphuric acid and ferrous ion containing effluent or acidic drain water. The most significant oxidation reactions in sulphidic tailings may be summarized and represented by the following equations:

$$FeS_2 + 3\frac{1}{2}O_2 + H_2O \rightarrow Fe^{2+} + 2SO_4^{2-} + 2H^+$$

$$Fe^{2+} + \frac{1}{4}O_2 + 2\frac{1}{2}H_2O \rightarrow Fe(OH)_3 + 2H^+$$

$$Fe^{2+} + \frac{1}{4}O_2 + H^+ \rightarrow Fe^{3+} + \frac{1}{2}H_2O$$

$$FeS_2 + 14Fe^{3+} + 8H_2O \rightarrow 15Fe^{2+} + 2SO_4^{2-} + 16H^+$$

It can thus be seen that the predominating promoters of the oxidation of iron sulphides, in particular of pyrite, are oxygen and water. Similar equations may be written for the oxidation of pyrrhotite which is the other dominant sulphide mineral present in ore deposits. The rate and extent of these reactions are also influenced by other factors, including the presence of sulphur-oxidizing bacteria (*Thiobaccilli ferrooxidans* and *Thiobaccilli thiooxidans*) in the ground. The resulting acidic sulphate solution will react with other heavy metals present as sulphide or in other form, leading to heavy metal sulphate containing acidic drain water. Ferric ions generated will act as oxygen carriers in promoting further oxidation of the sulphidic minerals, thus further enhancing sulphuric acid formation, and leading to more acidic metal sulphate and similar salt containing solutions which can escape and contaminate the regional waters and lead to similar hazards detrimentally affecting the environment. The above discussion is intended merely as a brief summary of the more important mechanisms leading to acid mine drainage.

The above reactions taking place in sulphide bearing tailing deposits exposed to air and atmospheric moisture usually lead to the formation of three distinct zones: i) a top, highly acidic layer having pH less than 3, usually extending to a depth of 30–70 cm; ii) a hard layer, often referred to as 'hard pan', having thickness between 5 and 15 cm, containing gypsum, iron oxides, silicates and oxides or oxysulphates of other metals, which are usually formed by the interaction of calcium and silicate compounds present in the ground with sulphuric acid and salt containing drain water seeping from the top zone, and iii) a generally undisturbed zone of tailings which has not been oxidized hitherto, comprising unreacted sulphides, rock and other components of tailings. It has been suggested that the 'hard pan' could protect the unaffected, deeper layers from further oxidation and acid drain formation. However, weathering, ice and snow in the winter and drought in the summer, and the inherent volume changes brought about by structure and composition changes in the course of the formation of the 'hard pan', are likely to result in erosion, breaks and cracks in the hard layer, which then can allow air and moisture to reach the previously unaffected zone, initiating further oxidation and acid drainage. It may be concluded that the 'hard pan', and by the same argument any hard covering layer, is unlikely to hinder reliably the oxidation of sulphidic tailing deposits and avoid the formation of acid ground water, in the long term. As mentioned above, reclaiming by revegetation sulphidic tailing deposits which have been previously exposed to oxidation, may fail, even if the top layer of the tailing deposit is covered by top soil and fertilizer. The roots of the growing plants and trees may penetrate below the top soil, into the oxidized tailing deposit, encountering water soluble salts and very acidic conditions, and may die after the first winter.

It has been observed that the oxidation of sulphides in mine tailings and similar mineral process waste products may be substantially diminished if the tailings and waste products are kept under water, such as in tailing ponds. However, if the water level in the tailing pond is not maintained, or the pond is allowed to dry out or drain away, thus allowing the oxidation of sulphidic compounds in the tailings to proceed, undesirable acid drainage is likely to be the result.

Another method proposed to prevent a harmful effluent generated seeping into ground water is to provide an impervious lining for a cavity containing the effluent generating waste material, this method, however, has serious drawbacks.

There are known processes for capping or providing a hard cover or sealing layer over municipal waste or industrial waste deposits, in particular for covering landfill sites and waste dumps. Composite layers utilized in such processes may be made of naturally occurring materials, such as gravelly moraine, loam, sand and similar substances, mixed with larger particles of gravel, sand and the like, in specific particle size distribution ranges. The layers made of such mixtures are frequently reinforced with a geotextile to provide a composite sealing layer. Such a process is described, for example, in U.S. Pat. Nos. 5,141,362 and 5,374,139, issued to J- U. Kugler on Aug. 25, 1992 and Dec. 20, 1994, respectively. The Kugler patents teach a self sealing cap for waste dumps, comprising mixtures of fine particles capable of flowing and sealing cracks that have formed. The cap supported on a geotextile mat, is overlain by a filter layer and a soil layer. Other processes for synthetic hard covers over municipal waste piles, admix building waste and binders such as cement kiln dust, bentonite, fly ash, portland cement and the like, which may also be mixed with cellulose or plastic fibres and other organic or processed carbon bearing materials. The covers are required to eliminate bad odour, or damage by birds and animals, or in some cases to contain effluent formation, but not to control oxidation. Furthermore, the effluent generated by municipal waste is not necessarily harmful to the environment and in any case, it can be treated to render it harmless. In contrast, acid drain water generated in the oxidation of sulphidic mine tailing deposits cannot be readily eliminated or treated. As was discussed above, methods to provide a hard cover is not considered to be applicable to deposits of sulphidic mine tailings and sulphidic waste rocks, as a protective or oxidation preventive measure.

A method for providing a cap for tailing ponds is described in U.S. Pat. No. 5,118,219, issued to D. D. Walker Jr. on Jun. 2, 1992. The cap is intended to prevent the drying out of such ponds and thereby eliminate dusting. The capping cover is made of lime, a sulphate component, a pozzolanic material and water, and allowed to harden.

It is known to introduce carbonaceous substances in direct contact with the sulphidic tailings to consume oxygen and thereby to prevent, or at least hinder, oxidation. In one form of utilizing a carbon containing material, in particular carbon in the form of dead vegetation and similar materials, the organic carbon containing material is mixed in with the sulphide bearing tailing particles, with the objective of acting in-situ as adsorbent for the acid produced as well as a reductant, thereby avoid oxidation. The treatment of sulphide bearing mine tailings by providing organic carbon layers in the tailing deposit directly below the water table and mixing particulate organic carbon source with the sulphide bearing tailing particles disposed above the water table, is described in Canadian patent 1,327,027 issued to Blowes et al. on Feb. 15, 1994. The position of the carbon layer and the amount of carbon mixed with the tailings are calculated based on the depth of the sulphidic tailings above the water table. The water table level may, however, shift with time and season, or all the carbon mixed in within the tailings may be consumed, thereby allowing the tailings to oxidize without hindrance.

There are several studies currently undergoing trials, involving various carbonaceous substances capable of consuming oxygen, directly overlaying sulphidic tailing deposits. Such carbon containing substances include wood shavings, compost, treated sewage sludge and municipal waste, dried and chopped vegetation, and substances of similar nature. However, whether a single capping layer containing predominantly carbon bearing substances is capable of preventing the oxidation of the underlying sulphide bearing deposit for a prolonged time period is not yet known. It may be assumed that if the organic carbon is not mixed in some way or anchored to a material which is able to retain water, the carbon containing material may dry out and be blown away. In other words, it seems that a predominantly carbonaceous material containing cover layer on top of the sulphidic tailings deposit is likely to lose its effectiveness in the long term.

There have been other known studies in which various natural particulate layers were provided over sulphidic tailing deposits, but those have not been shown to prevent the oxidation of the underlying sulphidic materials, or they have been found to require additional and costly effluent treatment.

It may be concluded from the above, that there is a need for an inexpensive method to eliminate or at least, substantially slow down the oxidation of sulphide bearing tailing and waste rock deposits.

SUMMARY OF THE INVENTION

It is the object of the present invention to provide a composite capping cover over sulphide bearing tailing and waste rock deposits, made of layers of readily available and inexpensive materials, and which requires substantially no maintenance.

A new method has been found for diminishing and preferably eliminating the oxidation of sulphides contained in tailings and mine waste materials, by providing a subaerial composite capping cover over a deposit of sulphide containing tailings and sulphide bearing mineral waste materials. The sulphidic particulate material in the deposit has low hydraulic conductivity, and a slope enclosing an angle greater than 0.5% with the horizontal. The method for obtaining a composite capping cover over the deposit of sulphidic particulate material comprises depositing a first particulate layer made of an inert, fine substance, having average particle size between 10 gm and 200 um, hydraulic conductivity greater than $10^{-7}$ cm/sec, and matric suction value greater than 4 cm of water. The deposited first particulate layer is extended over the surface of the deposit in depths in excess of 4 cm. The method further comprises depositing a second particulate layer containing an inert, fine-granular substance, having average particle size between 200 and 5000 gm and hydraulic conductivity between $10^{-3}$ cm/sec and 1 cm/sec. The hydraulic conductivity of the fine-granular particles containing second particulate layer is at least an order of magnitude higher than the hydraulic conductivity of the first particulate layer and the ratio of the matric suction value of the fine-granular particles contained in the second particulate layer to that of the fine particles in the first particulate layer is less than 1:2. The deposited second particulate layer is extended over the first particulate layer in depths which is at least 1.5 times the matric suction value of the fine-granular particles making up the second particulate layer, measured in centimeters of water. A third particulate layer is subsequently deposited over the sulphidic particulate deposit, comprising an inert, coarse-granular substance, having average particle size greater than 3 mm and hydraulic conductivity higher than 1 cm/sec. The third particulate layer is extended over the second particulate layer in depths in excess of 6 cm.

An organic carbon bearing substance may be mixed with the inert, fine substance comprised in the first particulate layer or with the fine-granular substance comprised in the second particulate layer, prior to being deposited.

In another embodiment of the method for providing a composite subaerial capping cover for a deposit of sulphidic particulate material an additional layer of a particulate substance capable of sustaining growth of vegetation, is deposited in a layer below and adjacent the third particulate layer comprising an inert, coarse-granular substance.

The preferred embodiments of the invention are described below with reference to the drawings and illustrated by working examples.

DESCRIPTION OF PREFERRED EMBODIMENTS

As has been discussed above, tailing management of sulphide bearing tailings and sulphide containing waste products needs to address the elimination of oxidation of the sulphides therein and the prevention of acid drainage together with the prevention of solubilization of salts of heavy metals. It has been noted that one approach to eliminate or at least, substantially slow down the oxidation of sulphide bearing tailings or any sulphide containing particulate material, is to keep the particles in the tailing deposit wet, or maintain some means of moisture retention adjacent to the top layer of the sulphide bearing deposit, thereby creating a diffusion barrier to atmospheric oxygen. The effluent or run-off water obtained in such process may or may not need to be treated in this case, however, the primary aim is to keep the tailing and waste rock wet, in particular, the particles in the top layer of the tailing and waste rock coated with a film or layer of water to prevent ingress of oxygen. Thus the primary object of the present invention is to provide a capping cover for deposited tailings and similar waste products of mining, in particular sulphide bearing tailings, such that the rate of oxidation of the sulphides in the tailings may be reduced to a very low value or substantially eliminated.

Tailings and waste products of mining are usually deposited in the shape commonly known as a pile, over competent rock, volcanic rock, clay, or similar porous or non-porous permanent ground formation. Under certain circumstances, the tailing pile may be located over impermeable plastic sheets placed over the ground. Ground water and underground streams which are contributory to the regional waters, such as springs, rivers and lakes, are commonly found below such ground formations.

The tailing deposit or pile usually has a peak, or a relatively small flat area, which is highest above ground level and the rest of the tailings pile usually slopes away meeting ground level at an angle which may range between 0.5 to 45°. The sloping of the deposit surface is often uneven, or the angle of slope may vary along the surface. It is preferred that the tailing pile to be capped by the present method be free of notable berms or similar surface protrusions which interrupt the gradual decrease in the level of the pile above ground. A generally continuous slope between the peak of the tailing deposit and ground level is considered to be of advantage as this permits the distribution of the composite cover from above the peak of the deposit.

The tailing deposit or the sulphide containing material making up the pile, may have originated as the separated residue of a mineral separation process, or crushed sulphide containing waste rock, or a sulphide containing waste product of any mining process, or a mixture of the above, but for the sake of convenience it will be referred to in the discussion below as tailings, and it is to be understood that this term covers any sulphidic tailing and mine waste material deposit containing sulphidic particulate material. The sulphide content of the tailings may be as low as a fraction of a percent or the sulphidic particulate may be the predominant constituent of the tailing deposit. The particles of tailings in the pile are usually tightly packed under their own weight and have low hydraulic conductivity. The hydraulic conductivity of a tailing deposit is typically less than $10^{-6}$ cm/sec, but in some instances it may be higher. The value of hydraulic conductivity and the particle size range of the particulate material in the tailings deposit will depend on the origin of the tailings.

It has now been found that if a capping cover is provided over a sulphidic particulate material containing deposit, which is comprising at least two layers capable of retaining moisture of predominantly atmospheric origin, thereby creating a diffusion barrier to oxygen ingress into the deposit, the oxidation of sulphides which results in acid drainage and formation of metal salt solutions, can be substantially eliminated. It is an important feature of the present method that the capping cover is provided in a continuous manner over the subaerial surface of the tailing deposit between the peak and the boundary of the deposit with the underlying ground. The present method can be applied to recently deposited sulphidic tailings or to tailings that have been deposited in the past. Under some circumstances, the capping cover is provided over a radial segment between the peak and the boundary of the tailing deposit, and fresh tailings may continue to be deposited over the non-capped portion of the tailings pile.

The surface layer of the sulphidic particulate containing deposit is kept moist in accordance with the novel composite capping cover, by means of providing particulate layers within the capping cover which have selected hydraulic conductivity ranges. Hydraulic conductivity is usually understood to mean the rate at which a liquid, most frequently water, migrates through a layer of particulate matter and is usually measured in centimeter per second (cm/sec). Thus the value of the hydraulic conductivity is an indication of the range of the particle size of the particulate matter comprised in the layer, however, some other factors may also influence and contribute to the value of hydraulic conductivity, such as the proportion of the particles which is close to the average particle size, often referred to as the uniformity of the particles within the size range, degree of wetting of the particles by the liquid, the porosity of the particles, to some extent the shape of the particles as this is likely to affect the packing density of the particulate matter in the layer, and such like.

The moisture that is retained by or is slowly migrating through the capping cover, usually originates as atmospheric precipitation. The nature and particle size range of the particles in the layers making up the composite capping cover, hence the structure of the capping cover is devised to a large measure by estimating the moisture available as atmospheric precipitation in the region, such that moisture lost by evaporation and slow seepage is replenished by natural means. It is desirable that the atmospheric precipitation in the region where the composite capping cover is applied to a tailing deposit exceeds 150 mm per annum, and it is preferred that the annual rate of precipitation is greater than 250 mm. Should an unexpected prolonged drought occur a temporary sprinkling mechanism may be installed. It is, however, intended that under normal circumstances no maintenance of the moisture content of the composite capping cover be necessary.

The particles comprised in the layers making up the capping cover are inert in the sense that they are non-reactive with one another or with atmospheric moisture, are resistant to oxidation by air under normal atmospheric conditions and will not generate a water soluble compound. For the sake of clarity however, it is noted, that inert in the present sense does not exclude the ability to neutralize or react with any acidic component that may be inadvertently present or may be generated to a small extent in the tailings deposit.

Figure 1:
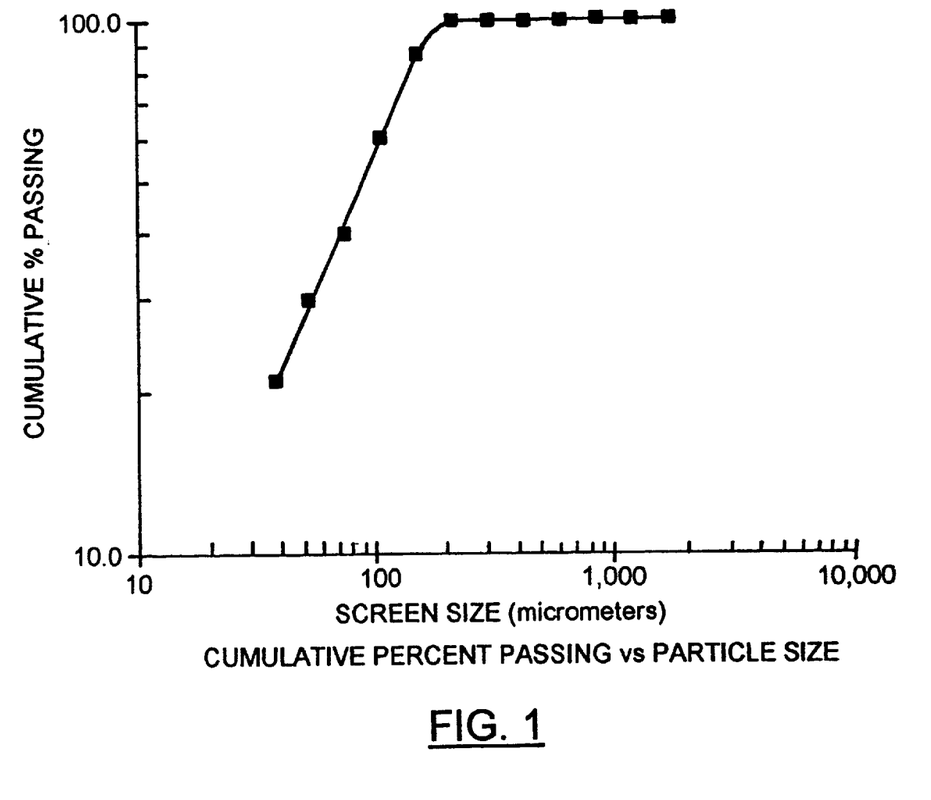
FIG. 1 represents a log-log plot for assessing the average particle size of substances utilized in the present invention.

The particle size of most naturally occurring particulate substances may vary from very fine to large granular, and the size range of the particles of such substances may be defined in several different ways. Methods of estimating the size distribution of particles, as well as various formulas for defining the size range of the majority of the particles, are well known. For the sake of clarity, in the present description the term average particle size is understood to mean the particle size or sieve hole dimension that 80% of the particles under consideration are passing, unless stated otherwise. This particle size distribution is best represented by a log-log plot. The log-log plot of the particle size range of sandy loam is shown as an example, on FIG. 1. The logarithm of the cumulative percent passing is depicted on the ordinate, and the logarithm of the screen size in micrometers ($\mu$m) is shown on the abscissa. It can be seen that the steeper is the line representing the size distribution the greater is the uniformity of the particles. In the present context, fine is understood to mean that 80% of the particles have size less than 200 $\mu$m, fine-granular to mean that 80% of the particles are less than 5000 $\mu$m in size and coarse-granular is considered to have average particle diameter in excess of 3 mm.

It has been observed that when two layers consisting of particles having different particle size ranges interact with respect to their moisture retaining capabilities, a layer having thickness of at least about 2 cm of appropriately small sized particles can keep an underlying layer moist, provided the upper layer has a low hydraulic conductivity, but not lower than the hydraulic conductivity of the underlying layer. On the other hand, moisture may be lost from a wet underlayer by evaporation due to capillary action of the particles in the upper layer. The above is a clear indication that both the hydraulic conductivity and the capillarity are important parameters in selecting suitably sized particles to be incorporated in the composite capping cover for sulphidic tailing deposits.

Capillarity within a layer of particles is related to capillary forces raising the level of a liquid, in this case water, above the continuous surface of a larger body of the liquid or water. The capillary forces hold the moisture between the pores and crevices of the particles packed down under their own weight, or in other words, the matrix of the particles in the layer is capable of retaining a certain amount of moisture between the particles as a very thin film of water. The amount of moisture the matrix of the particles is capable of holding is related to the wettability of the particles by water, the size range of the particles, and to the width of the particle size range or the uniformity of the particles. Capillary forces acting between the particles may be assessed by measuring the force required to counteract the capillary forces. The counteracting force is denoted by soil technologists as matric suction. There are known methods to determine the matric suction value of a particulate material. Matric suction is measured in units of pressure such as kPa, or usual equivalents, e.g. column height of water measured in cm. High matric suction values in a layer of particles are likely to result in high degree of evaporative loss and to the upward transport of salt solutions, if such are present. Matric suction is sometimes referred to as air entry value (AEV), meaning the volume of air replacing the volume of water removed by suction from the matrix of particles.

It has been found that the capping cover for eliminating oxygen ingress into sulphidic tailing deposits needs to have at least two particulate layers to perform the following principal functions:
 i) to provide sufficient moisture for the sulphidic deposit to prevent drying out of the top surface of the deposit;
 ii) to reduce evaporative loss; and
 iii) to protect the capping cover layers from erosion.

It has also been observed that satisfactory performance of a composite capping cover leads to a rise in the water table level below the deposit.

The convenient depth of an individual layer in the capping cover ranges between 3 to 50 cm, preferably between 4 to 30 cm, depending on the nature of the components of the layer; a particulate layer thinner than 2 cm may not be effective, however a substantially thicker particulate layer may increase the cost of the process unnecessarily, that is the upper limit of the depth of the layer is dictated by economic considerations.

In the first preferred embodiment of the composite capping cover for deposits of sulphidic particulate materials broadly described as a sulphide containing tailing deposit, the capping cover is constructed of three particulate layers of inert materials. The first layer is deposited to lay over the sloping surface of the deposit and is made of inert, fine particles capable of providing hydraulic conductivity in the range of $10^{-9}$ to $5.10^{-3}$ cm/sec. Typically but not necessarily, the hydraulic conductivity of the first particulate layer is similar to or slightly higher than the hydraulic conductivity of the particles in the deposit to be capped. The hydraulic conductivity of the first layer, however, may be lower than the hydraulic conductivity of the deposit to be capped. The objective of the capping cover is to keep the top surface of the deposit wet and in the instance of the deposit having a relatively high hydraulic conductivity, a thicker layer of low hydraulic conductivity first particulate layer may be required. The average particle size of particles capable of providing the required range of hydraulic conductivity is usually found to fall between 10 $\mu$m and 200 $\mu$m, depending on the nature of the particles. The layer constructed of such fine particles usually has a high matric suction value, preferably higher than 4 cm of water. The depth of the first particulate layer, that is the layer adjacent to the surface of the tailings deposit, conveniently ranges between 4 and 30 cm, but at any rate it is greater than 4 cm. The sulphide content of the tailing deposit and the average seasonal rainfall, however, will also have a bearing on the preferred layer thickness of the first particulate layer. The higher the sulphide level in the deposit and the lower the average seasonal rainfall, the greater is the necessity to keep the top layer of the deposit moist.

The particulate material suitable for use in the first particulate layer includes oxidic mill tailings, low-sulphide containing mill tailings, desulphurized mill tailings, neutralized mill tailings, fine sand, sandy clay, sandy loam, silt, loess, fly ash, glacial till, fine materials of alluvial origin and substances of similar size and nature.

The second layer of the capping cover for a tailing deposit is comprising inert, fine-granular particles having average particle size between 200 and 5000 $\mu$m, in particular between 200 and 2000 $\mu$m and a relatively narrow size range within that band, that is the preferred particles are relatively uniform in size. The hydraulic conductivity of the fine-granular particles of the second particulate layer is preferably between $10^{-3}$ and 1 cm/sec. The role of the second layer is to allow sufficient moisture to reach the first layer at the appropriate rate, and at the same time substantially reduce evaporative loss of moisture, as well as to protect the first layer from erosion and suspension loss in the instance of a storm and fast flow of rain water. Hence, the fine-granular particles of the second layer has a low matric suction value, more particularly, the ratio of the matric suction value of the particles in the second layer to the matric suction value of the particles in the first layer is less than 1:2, preferably less than 1:3. The layer thickness or depth of the second layer may range between 3 to 30 cm, but preferably the thickness of the second layer is at least 1.5 times the matric suction value of the fine-granular particulate material of second layer, expressed in centimeters of water. Typically, the preferred depth of the second layer is in excess of 6 cm. It is noted for the sake of clarity, that the matric suction value referred to in the present discussion is the matric suction exhibited by the particulate matter under consideration, when the particles are in a state close to being saturated by moisture.

The inert, fine-granular particulate material which is suitable to constitute the second layer includes granulated slag, granulated desulphurized slag, desulphurized rock, fine gravel, winter sand, finely crushed rock and similar inert materials of appropriate particle size range.

The third particulate layer is made up of coarse-granular, inert material of average particle size greater than 3 mm diameter, and of relatively uniform size distribution. Preferably the average particle size of the third layer is at least an order of magnitude larger than the average particle size of the second layer. The hydraulic conductivity of the particles in the third layer is high, usually higher than 1 cm/sec. The matric suction value of the coarse-granular particles in the third layer is usually less than 3 cm of water and may be close to zero. The depth of the third layer is in excess of 6 cm, and preferably greater than 14 cm. The role of the third layer is to protect the underlying layers from erosion and damage by fast moving streams of water, such as may occur at times of heavy storms, as well as to slow down evaporation from the underlying layers. Furthermore, the third capping layer may serve as a thermal buffering layer to diminish mechanical stresses resulting from seasonal freezing and thawing. It is noted that highly uneven particles size range and pieces of large rock, such as larger than 7–9 cm diameter, should preferably be avoided in the third layer, because the underlying layers may be damaged by heavier equipment moving across the surface of the capping cover. The third particulate layer is usually made up of crushed rock, which may originate in igneous, sedimentary or metamorphic rocks, crushed stone such as limestone or sandstone, and similar materials. Other coarse-granular materials for use in the third layer include coarse gravel, naturally occurring sea shore and river pebbles and similar natural materials which need no crushing only screening to ensure that the particles are of the desired size range.

Man-made substances, such as crushed cement, building stone, paving stone and similar demolition materials, or by-products of industrial processes, such as pellets and glass beads, may also be used in the layers, as long as these are of the appropriate size.

The layers of the composite capping cover may be discharged either as dry particles or in the form of an aqueous slurry, and conveniently from a point above the peak of the sulphide containing tailing deposit, but other methods of providing a continuous layer may also be utilized. The aqueous slurry of particles usually has higher than 50% slurry density, but the slurry may be less dense if so desired. The aqueous slurry is usually allowed to flow down from the peak along the surface of the deposit. It is convenient to deposit the coarse-granular material of the third layer in dry form, partly because a coarse-granular material flows more readily in the dry state and partly because delivery as a slurry may subject the conveying equipment to substantial wear and tear. It is preferred that the distribution is even, continuous and the layer has a generally constant thickness or depth. To attain a relatively even layer thickness in case of dry material distribution, mechanical means may be utilized such as rakes, blades, shovels etc. It is also preferred that the distribution of the particles forming the layer does not interrupt the continuous sloping of the surface of the tailing deposit. The individual layers are deposited consecutively.

In another embodiment of the present invention organic carbon-rich substances may be introduced in the form of an appropriate admixture into the first and/or the second particulate layer of the composite capping cover. The mixture is made up prior to depositing the layer. The organic carbon-rich substances are such with respect to particle size and matric suction, that they do not affect the characterization of the layer with which they are mixed. The organic carbon-rich substance, such as raw or treated sewage sludge, composted municipal waste, biomass, organic fibres, loam, peat, sawdust, fine waste products of the cellulose and forest industry and similar small-sized organic carbon containing substances of reducing nature, may provide an anaerobic environment for sulphate reducing bacteria. Moreover, the admixed organic carbon-rich substance may be beneficial in promoting the reduction and precipitation of iron and base metals which may migrate from the underlying sulphidic tailing containing deposit, and at the same time, remove oxygen from water filtering through the top layer and/or diffusing into the layers. Organic debris, such as dried up vegetable matter, may also collect on top of the second layer, which is often the natural waste products of plants and vegetation in the neighbourhood of the tailing deposit, and as such, may provide additional oxygen reducing benefits.

In yet another embodiment of the present invention, another particulate layer which is capable of supporting plant growth and the resulting vegetation, is deposited above the second particulate layer and below the third layer.

EXAMPLE 1

The hydraulic conductivity of a fine-granular gravel was measured by the falling head method. The gravel particles were packed into a 50 mm internal diameter PVC permeameter, which comprises a polyethylene porous plate of 25 μm sized pores, removably fitted to the lower portion of a graduated burette. The gravel particles were compacted in a known thickness in the burette above the porous plate and saturated with deionized water. Subsequent to saturation the drop of the water level (head) in the burette was recorded with time. The level drop was plotted against time in semi-log scale, and the obtained graph is shown on FIG. 2.

Figure 2:
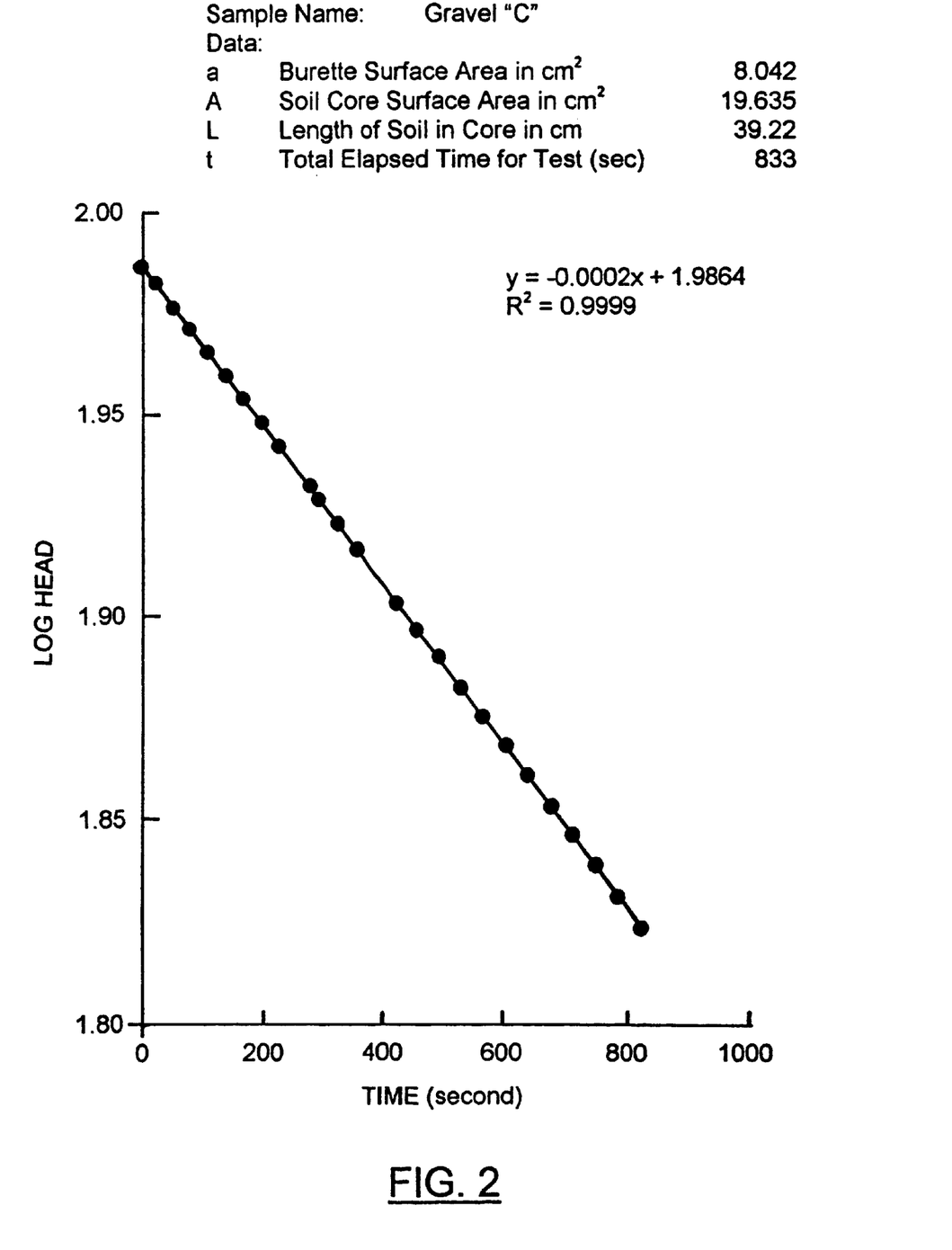
FIG. 2 shows the measurement of hydraulic conductivity of sandy loam by plotting the drop of the water level against time.

The slope S, of the plot of experimentally observed points was calculated as −0.0002. The hydraulic conductivity K, was calculated utilizing the following Equation (1):

Slope $S=-0.434\ AK/(aL)$, where the factor −0.434 incorporates various conversion constants inherent in the measurements, A=cross-sectional area of the particulate sample ($cm^2$), which incorporates particle size values in a known manner, a=cross-sectional area of the burette ($cm^2$), and L=thickness (length) of the sample in cm.

The hydraulic conductivity K (cm/sec), of the gravel sample was derived by introducing into Equation (1) the experimentally measured and calculated values for: $A=19.635\ cm^2$, $a=8.042\ cm^2$, and $L=39.22$ cm, thus yielding the value for K as follows:

$-(slope) \times (aL)/0.434\ A = 0.0002(8.042 \times 39.22)/0.434 \times 19.635 = 7.40\ 10^{-3}$ cm/sec. Thus the hydraulic conductivity of the fine-granular gravel was found to be $7.40\ 10^{-3}$ cm/sec.

The hydraulic conductivity of all the particulate materials utilized in the present embodiment of the invention was measured in a manner similar to that described above, but other methods may also be used.

EXAMPLE 2

The capillary forces acting between the particles of a soil sample is estimated by measuring the matric suction in a moisture containing sample. In the present measurements the moisture containing sample of soil or particulate material, was packed into an impermeable ring attached around and above the top surface of a porous ceramic disk. The soil sample has been saturated with water prior to the measurement. A negative pressure or suction was applied at the bottom surface of the ceramic ring and the amount of water drained from the sample was measured. The retained moisture content of the sample after each measurement was calculated and plotted against the appropriate values of negative pressure applied. The final moisture content of the sample was determined by the usual method of weight loss on heating. The dry density of the material tested was determined in a separate measurement.

Figure 3A:
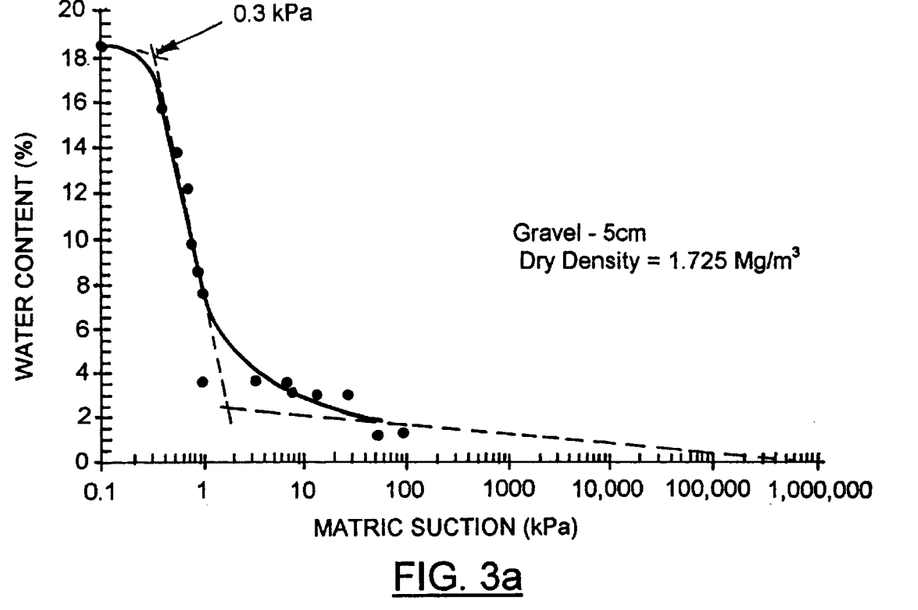
FIG. 3a and FIG. 3b represent graphs for estimating the matric suction values of fine gravel and sandy loam, respectively.

The matric suction of a fine-granular gravel was measured and the curve obtained in the matric suction measurements of fine-granular gravel is shown on FIG. 3a. The matric suction value of interest in the present consideration, is the matric suction of the moisture saturated sample, and is assessed by extrapolating the curve to the matric suction value close to the moisture saturated state of the sample. Hence, the matric suction of the fine-granular gravel was found to be 0.3 kPa=3.06 cm water. (100 kPa=75 cm Hg=1020 cm water). The dry density of the fine-granular gravel in the present test, was found to be 1.725 $g/cm^3$.

Figure 3B:
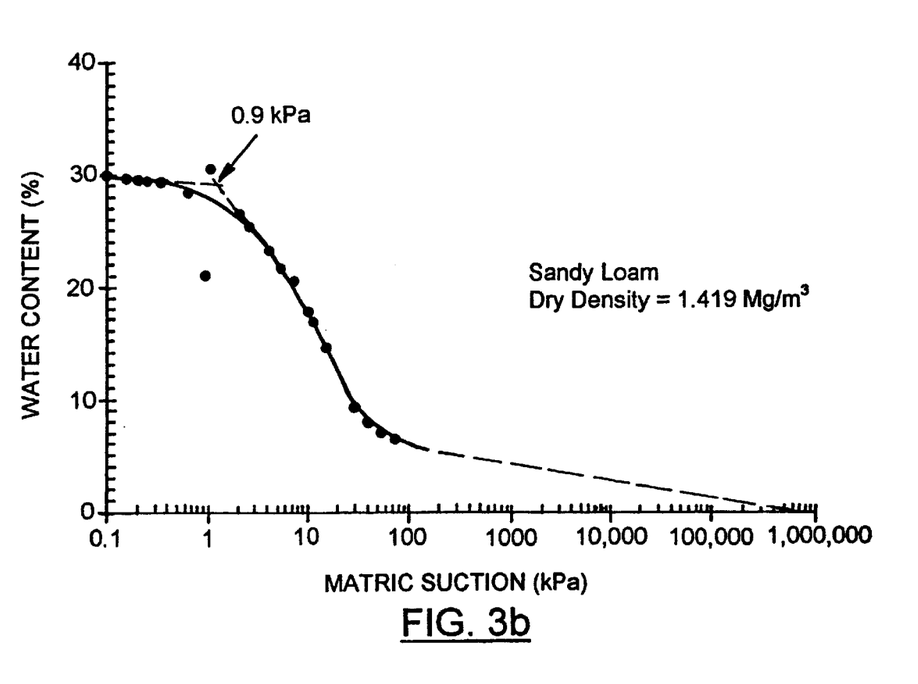

The curve representing the matric suction values of sandy loam as a function of its water content is shown on FIG. 3b. The matric suction of a moisture saturated sandy loam sample was assessed to be 0.9 kPa or 9.18 cm of water.

The matric suction values of the particulate materials under consideration in the present embodiment of the invention were determined according to the above described procedure, however, other methods of estimating the capillary forces in a moisture saturated particulate sample can also be used.

EXAMPLE 3

Figure 4:
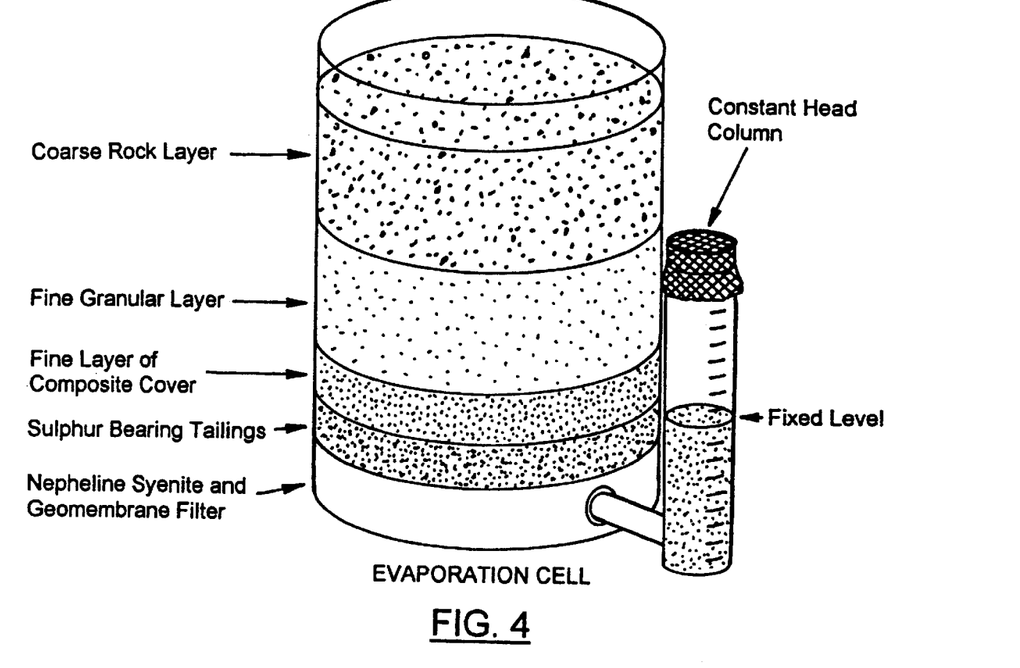
FIG. 4 is a schematic drawing of an evaporation cell for measuring evaporation rates in composite particulate layers.

Laboratory evaporation tests were conducted to establish the effect of the thickness of the second layer containing fine-granular particles on the rate of evaporation of moisture retained in the first layer of the composite cover of the present invention. The evaporation cell utilized is shown schematically on FIG. 4. The base of the cell communicates with a constant head column of small diameter. The base contained a filter bed made of 5 cm thick layer of nepheline syenite covered with a geotextile material to prevent particles being carried over to the constant head column. The sulphur bearing tailing layer representing a sulphidic particulate containing deposit was located above the geotextile and was overlain by the composite cover column made of 3 layers. The hydraulic conductivity of the sulphur bearing tailing was found to be $10^{-6}$ cm/sec. The composite capping cover in the evaporation tests consisted of a first particulate bottom layer made of desulphurized gold tailings, an intermediate or second layer containing fine-granular slag particles and a top layer made of coarse waste rock. The thickness of the fine-granular particles containing second layer was varied and the effect on the evaporation rate was assessed by measuring the amount of water required to maintain the water level in the constant head column. The structure of the composite cover test columns in the evaporation tests are indicated in Table 1:

TABLE 1

| Material | Av. Particle Size | Test 1 | Test 2 | Test 3 |
|---|---|---|---|---|
| Waste Rock | >3 mm | 10 cm | 10 cm | 10 cm |
| Granulated Slag | 750 μm | 5 cm | 10 cm | 20 cm |
| Gold Tailings | 28 μm | 10 cm | 10 cm | 10 cm |
| S-cont. Tailings | <20 μm | 10 cm | 10 cm | 10 cm |
| Filter Bed | N/A | 5 cm | 5 cm | 5 cm |
| Av. Evaporation Rate mm/day: | | 0.86 | 0.44 | 0.15 |

The hydraulic conductivity of the desulphurized gold tailings forming the bottom, fine particles containing layer was found to be $6.6 \; 10^{-5}$ cm/sec and its matric suction value 316 cm of water (31 kPa). The granulated slag utilized in the fine-granular second layer of the columns had hydraulic conductivity of $4.1 \; 10^{-2}$ cm/sec and matric suction value 6.6 cm of water (0.65 kPa). The hydraulic conductivity of the top layer of waste rock, was estimated to be higher than 25 cm/sec and of having very low matric suction value. The variable in the evaporation cell tests was the layer thickness of the second layer, which was varied between 5 and 20 cm, as shown in Table 1.

The water table level was maintained at 5 cm depth of the desulphurized gold tailings layer, to ensure that the fine particles in the bottom layer were saturated with water and the water loss was due to evaporation only. The water table level was maintained during the tests by replacing the water lost by evaporation. The cumulative evaporation of water, observed for each column-test as the total drop in mm of the water level in the constant head, plotted against time is shown on FIG. 5. A comparative test was run with the evaporation cell containing no particulate matter above the geotextile only water, the water level being maintained at an arbitrary level and the water lost by evaporation measured. The comparative test is referred to as "pan test" in FIG. 5. The average evaporation rate of the pan was 1.92 mm/day.

Figure 5:
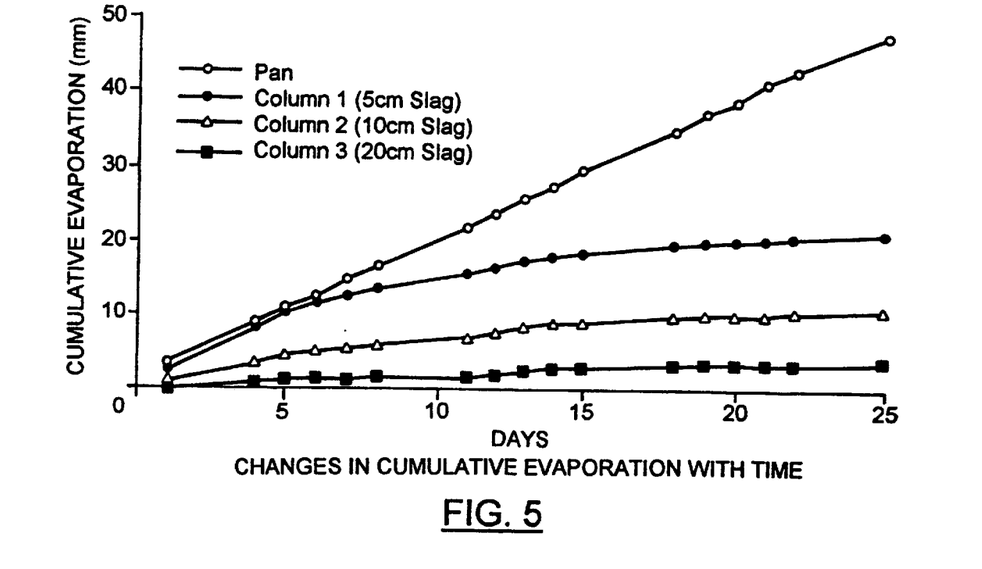
FIG. 5 is a graph showing the effect of thickness of the fine-granular layer on the rate of evaporation.

It can be seen that rate of evaporation is nearly as high as in the "pan test", when the thickness of the second layer containing fine-granular particles is less than its matric suction value. When the layer thickness is increased to 1.5 times the matric suction value (Test 2) the rate of evaporation is reduced to half of that in Test 1. In the instance of Test 3, the thickness of the second layer is 3 times its matric suction value, and the evaporation from the column is shown to have diminished very noticeably.

EXAMPLE 4

The effects and the stability of the capping cover of the present invention were tested under pilot scale conditions over a tailing deposit of 10303 m² surface area and 4° slope. The annual rain fall in the area was observed to be 978.8 mm. A fine particulate material known as sandy loam was deposited in dry state from a point above the peak of the tailing deposit to provide a first continuous layer of 10 cm depth. The average particle size range of the sandy loam was measured to be 80% passing 150 gm, as shown on FIG. 1, and containing 20% less than 38 μm sized particles. The hydraulic conductivity of this fine material was found to be $1.85 \; 10^{-3}$ cm/sec and the matric suction value for a water saturated sample was assessed to be 0.9 kPa or 9.18 cm of water. The second layer deposited evenly in a dry state from above the peak of the tailings deposit, was fine gravel, also known as winter sand. The particle size range of winter sand was found to be about 75% passing particle size less than 4800 μm, and having 0.6% less than 40 μm sized particles, indicating that the winter sand has a wide particle size range. The matric suction value at saturation was found to be 3.06 cm water and the hydraulic conductivity $1.48 \; 10^{-2}$ cm/sec. The winter sand layer was deposited in 10 cm thickness. The third layer of the composite capping cover was composed of coarse gravel containing a high portion of coarse-granular particles ranging between 3 to 12.5 mm in size. The hydraulic conductivity of the coarse gravel was high, 25 cm/sec and the matric suction value was found to be low, less than 0.3 kPa or 3 cm of water. The coarse gravel was deposited in a layer of 15 cm thickness. The coarse gravel was thus suitable for protecting the underlying layers from erosion by run-off waters in case of heavy downpours of rain, etc.

Eight wells were sunk over the composite capping covered surface of the tailing deposit to establish the water table height under the deposit. It was found that in a three month period of operation the level of the water table has shown an average rise of 29.2 cm. It has been clearly demonstrated that the capping cover was stable and effective in the tested time period.

The composite capping cover described hereinabove is designed to keep the surface of a sulphidic particle containing tailing deposit sufficiently moist to substantially eliminate oxidation of particulate sulphides and also prevent heavy metal salt formation in the tailing deposit at a relatively low cost of operation. The average particle size range, the nature of the particulate material and the thickness of the composite capping cover layers are selected and constructed with the seasonal rainfall of the region taken in consideration, hence the capping cover requires no or only very minimal maintenance. A particular advantage of the composite capping cover is that the various materials utilized in the layers of the composite capping cover are usually available at the site of the mining operation thus the expense of material requirements may be kept low.

It is noted that the method described herein may be equally useful in providing composite capping covers for non-sulphidic tailing deposits as well, in particular, when capillary rise of salts needs to be reduced. Furthermore, a composite capping cover may provide a moisture reservoir for assisting vegetative growth in the dry season when revegetating tailing deposits. In such instances the thickness of the first layer may be adjusted to different requirements.

A further incorporation of organic carbon containing materials into the composite layers allows in-situ bioremediation at relatively little additional cost. Moreover, the present process may utilize locally generated dead vegetable matter as an additional reducing component by trapping the vegetable debris below the coarse granular layer, at no extra cost.

Furthermore, the present process allows for the provision of revegetation of the tailing deposit by selected plants and hence, improves the visual appearance of tailing deposits.

The foregoing has described the principles, preferred embodiments and modes of operation of the present invention. However, the invention should not be construed as limited to the particular embodiments discussed. Instead, the above described embodiments should be regarded as illustrative rather than restrictive, and it should be appreciated that variation may be made in those embodiments by workers skilled in the art without departing from the scope of the present invention as defined by the following claims.

I claim:

1. A method for providing a subaerial composite capping cover over sulphide containing tailings and sulphide bearing mine waste materials, comprising the steps of:
   i) providing a deposit of sulphidic particulate material comprising at least one of the group consisting of sulphide mineral containing tailings, sulphide bearing waste rock and sulphide bearing mine waste material, said sulphidic particulate material having low hydraulic conductivity, said deposit having a peak and a slope enclosing an angle greater than 0.5° with the horizontal;
   ii) depositing a first particulate layer over said deposit of sulphidic particulate material, said first particulate layer comprising an inert, fine substance having average particle size between 10 Em and 200 $\mu$m and hydraulic conductivity higher than $10^{-7}$ cm/sec, matric suction value greater than 4 cm of water, said first particulate layer being deposited to yield said first particulate layer extending over said deposit of sulphidic material in depths in excess of 4 cm;
   iii) depositing a second particulate layer over said deposit of sulphidic particulate material, said second particulate layer comprising an inert, fine-granular substance, having average particle size between 200 $\mu$m and 5000 $\mu$m, hydraulic conductivity between $10^{-3}$ and 1 cm/sec, the hydraulic conductivity of said second particulate layer being at least one order of magnitude higher than the hydraulic conductivity of said first particulate layer, and a matric suction value, the ratio of the matric suction value of said second particulate layer to the matric suction value of said first particulate layer being less than 1:2, said second particulate layer being deposited to provide said second particulate layer extending over said first particulate layer to a depth which is at least 1.5 times the matric suction value measured in cm of water, of said second particulate layer; and,
   iv) depositing a third particulate layer over said deposit of sulphidic particulate material, said third particulate layer comprising an inert, coarse-granular substance, having average particle size greater than 3 mm and hydraulic conductivity higher than 1 cm/sec, said third particulate layer being deposited to provide said third particulate layer extending over said second particulate layer in depths in excess of 6 cm.

2. A method for providing a subaerial composite capping cover over sulphide containing tailings and sulphide bearing mine waste materials as claimed in claim 1, wherein the average particle size of said inert, fine substance is between 10 and 120 $\mu$m, the hydraulic conductivity of said first particulate layer is less than $10^{-3}$ cm/sec, and the ratio of the matric suction value of said second particulate layer to the matric suction value of said first particulate layer is less than 1:3, both matric suction values being measured in cm of water.

3. A method for providing a subaerial composite capping cover over sulphide containing tailings and sulphide bearing mine waste materials as claimed in claim 1, wherein the average particle size of said inert, fine-granular substance in said second particulate layer ranges between 200 and 2000 um and the depth of said second particulate layer is three times the matric suction value of said inert, fine-granular substance, measured in cm of water.

4. A method for providing a subaerial composite capping cover over sulphide containing tailings and sulphide bearing mine waste materials as claimed in claim 1, wherein said first particulate layer is deposited over said deposit of sulphidic particulate material from a point above the peak of said deposit, as a dry particulate layer or as an aqueous slurry having greater than 50% slurry density.

5. A method for providing a subaerial composite capping cover over sulphide containing tailings and sulphide bearing mine waste materials as claimed in claim 1, wherein said second particulate layer is deposited over said first particulate layer as a dry particulate layer or as an aqueous slurry having greater than 50% slurry density.

6. A method for providing a subaerial composite capping cover over sulphide containing tailings and sulphide bearing mine waste materials as claimed in claim 1, wherein said third particulate layer is deposited over said second particulate layer as a dry particulate layer.

7. A method for providing a subaerial composite capping cover over sulphide containing tailings and sulphide bearing mine waste materials as claimed in claim 1, wherein the hydraulic conductivity of said inert, fine substance in said first particulate layer is equal or higher than the hydraulic conductivity of the sulphidic particulate material in said deposit.

8. A method for providing a subaerial composite capping cover over sulphide containing tailings and sulphide bearing mine waste materials as claimed in claim 1, wherein said deposit of sulphidic particulate material is overlaying porous or non-porous geological ground formations.

9. A method for providing a subaerial composite capping cover over sulphide containing tailings and sulphide bearing mine waste materials as claimed in claim 8, wherein said deposit of sulphidic particulate material has a surface and a boundary with said ground formation, and said surface is a sloping surface between said peak and said boundary of said deposit of sulphidic particulate material.

10. A method for providing a subaerial composite capping cover over sulphide containing tailings and sulphide bearing mine waste materials as claimed in claim 9, wherein said first, second and third particulate layers are continuous between said peak and said boundary of said deposit of sulphidic particulate material.

11. A method for providing a subaerial composite capping cover over sulphide containing tailings and sulphide bearing mine waste materials as claimed in claim 9, wherein said first, second and third particulate layers are deposited in radial segments over said surface of said deposit of sulphidic particulate material.

12. A method for providing a subaerial composite capping cover over sulphide containing tailings and sulphide bearing mine waste materials as claimed in claim 1, wherein said inert, fine substance comprised in said first particulate layer is selected from the group consisting of oxidic mill tailings, low-sulphide containing mill tailings, desulphurized mill tailings, neutralized mill tailings, loess, fine sand, sandy clay, sandy loam, fly ash, silt, glacial till, fine materials of alluvial origin and mixtures of these.

13. A method for providing a subaerial composite capping cover over sulphide containing tailings and sulphide bearing mine waste materials as claimed in claim 1, wherein said inert, fine-granular substance comprised in said second particulate layer is selected from the group consisting of granulated slag, granulated desulphurized slag, desulphurised rock, fine gravel, finely crushed rock, winter sand and mixtures of these.

14. A method for providing a subaerial composite capping cover over sulphide containing tailings and sulphide bearing mine waste materials as claimed in claim 1, wherein said inert, coarse-granular substance comprised in said third particulate layer is selected from the group consisting of crushed rock, crushed stone, crushed limestone, pebbles and naturally occurring coarse materials, crushed demolition material and mixtures thereof.

15. A method for providing a subaerial composite capping cover over sulphide containing tailings and sulphide bearing mine waste materials as claimed in claim 1, wherein said method further comprises mixing a fine organic carbon bearing substance having average particle size between 10 $\mu$m and 200 $\mu$m with said inert, fine substance prior to depositing said first particulate layer thereby providing a first particulate layer of mixed organic and inorganic fine substances deposited over said sulphidic particulate material containing deposit.

16. A method for providing a subaerial composite capping cover over sulphide containing tailings and sulphide bearing mine waste materials as claimed in claim 1, wherein said method further comprises mixing an organic fine-granular substance having average particle size between 200 $\mu$m and 5000 $\mu$m with said inert, fine-granular substance prior to depositing said second particulate layer thereby providing a second particulate layer of mixed fine-granular organic and fine-granular inorganic substances deposited over said first particulate layer.

17. A method for providing a subaerial composite capping cover over sulphide containing tailings and sulphide bearing mine waste materials as claimed in claim 1, wherein said method further comprises depositing an additional layer of a particulate substance capable of sustaining growth of vegetation below and adjacent said third particulate layer comprising said inert, coarse-granular substance.

18. A method for providing a subaerial composite capping cover over sulphide containing tailings and sulphide bearing mine waste materials as claimed in claim 15, wherein said fine organic carbon bearing substance is selected from the group consisting of treated sewage, raw sewage, composted municipal waste, loam, biomass and organic fibres.

19. A method for providing a subaerial composite capping cover over sulphide containing tailings and sulphide bearing mine waste materials as claimed in claim 16, wherein said fine-granular organic carbon bearing substance is selected from the group consisting of dried particles of vegetation, peat, seaweed, sawdust and fine waste products of the forest industry.

20. A subaerial composite capping cover for the surface of a sloping deposit of sulphidic particulate material, the sulphidic particulate material having low hydraulic conductivity, comprising:

i) a first particulate layer over said surface of said sloping deposit of sulphidic particulate material, said first particulate layer comprising an inert, fine substance having particle size between 10 $\mu$m and 200 $\mu$m and hydraulic conductivity higher than $10^{-7}$ cm/sec, and matric suction value greater than 4 cm of water, said first particulate layer having been deposited to extend over said surface of said sloping deposit of sulphidic particulate material in depth in excess of 4 cm;

ii) a second particulate layer over said sloping deposit of sulphidic particulate material, said second particulate layer comprising an inert, fine-granular substance having average particle size between 200 $\mu$m and 5000 $\mu$m and hydraulic conductivity between $10^-$and 1 cm/sec, the hydraulic conductivity of said second particulate layer being at least one order of magnitude higher than the hydraulic conductivity of said first particulate layer, and a matric suction value, the ratio of the matric suction value of said second particulate layer to the matric suction value of said first particulate layer being less than 1:2, said second particulate layer having been deposited to extend over said first particulate layer in a depth of at least 1.5 times the matric suction value measured in cm of water, of said second particulate layer; and, iii) a third particulate layer over said sloping deposit of sulphidic particulate material, said third particulate layer comprising an inert, coarse-granular substance having average particle size greater than 3 mm, and hydraulic conductivity greater than 1 cm/sec, said third particulate layer having been deposited to extend over said second particulate layer in a depth in excess of 6 cm.

21. A subaerial composite capping cover for the surface of a sloping deposit of sulphidic particulate material, as claimed in claim 20, wherein said subaerial composite cover extends over a portion of said surface or the entire surface of said sloping deposit of sulphidic particulate material.

* * * * *